United States Patent
Nemoto

(10) Patent No.: US 7,574,626 B2
(45) Date of Patent: Aug. 11, 2009

(54) TRACE INFORMATION COLLECTING SYSTEM, METHOD AND PROGRAM

(75) Inventor: Kazuo Nemoto, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 11/337,377

(22) Filed: Jan. 23, 2006

(65) Prior Publication Data

US 2006/0168481 A1    Jul. 27, 2006

(30) Foreign Application Priority Data

Jan. 21, 2005    (JP)    ............... 2005-013600

(51) Int. Cl.
*G06F 11/00*    (2006.01)
(52) U.S. Cl. ............... 714/38; 714/26; 714/45; 714/47; 714/51
(58) Field of Classification Search ............ 714/26, 714/38, 45, 47, 51
See application file for complete search history.

(56) References Cited

FOREIGN PATENT DOCUMENTS

| JP | 5-257758 | 8/1993 |
|----|----------|--------|
| JP | 10078894 | 3/1998 |
| JP | 10091581 | 4/1998 |
| JP | 2001231160 | 8/2001 |
| JP | 2002132543 | 5/2002 |
| JP | 2002278804 | 9/2002 |
| JP | 2003122599 | 4/2003 |
| JP | 2004164271 | 6/2004 |
| JP | 2004362140 | 12/2004 |

*Primary Examiner*—Robert Beausoliel
*Assistant Examiner*—Charles Ehne
(74) *Attorney, Agent, or Firm*—Shimokaju & Associates, P.C.

(57) ABSTRACT

Occurrence of a failure in a computer system is appropriately detected, and information required for removing the failure is automatically collected. A trace information collecting system of the present invention which collects trace information indicating the course of processing of a program comprises a history recording section for recording a history of run and stop of a target program for which the trace information is to be produced, a similarity calculating section for calculating a degree of similarity between a first operation pattern in which the target program ran and stopped at the last time and a second operation pattern in which the target program ran and stopped at the time before last when the target program, which once stopped, starts to run, a failure occurrence determining section for determining that a failure occurred when the target program ran at the last time on condition that the similarity calculated by the similarity calculating section is lower than a reference similarity, and a trace information collecting section for collecting the trace information from the target program in response to the determination that the failure occurred, wherein the trace information is not collected if it is determined that the failure did not occur.

1 Claim, 7 Drawing Sheets

FIG. 2

| TIME | EVENT |
|---|---|
| ⋮ | ⋮ |
| MARCH 6 (FRI)   19:00 | STOP – STOP AFTER COMPLETION PROCEDURE |
| MARCH 9 (MON)   8:30 | START |
| MARCH 13 (FRI)   19:00 | STOP – STOP AFTER COMPLETION PROCEDURE |
| MARCH 16 (MON)   8:30 | START |
| MARCH 18 (WED)  13:00 | STOP – IMMEDIATE STOP PROCEDURE |
| MARCH 18 (WED)  13:15 | START |
| ⋮ | ⋮ |

20

TRACE INFORMATION COLLECTING SYSTEM, METHOD AND PROGRAM

BACKGROUND OF THE INVENTION

The present invention relates to a trace information collecting system, a trace information collecting method, and a trace information collecting program, more particularly to a trace information collecting system, a trace information collecting method, and a trace information collecting program which collect trace information indicating the course of processing of a program.

If a failure has occurred in a computer system being operated in a company or other entity, processing is advanced, for example, in the following flow in order to remove the failure.

(1) A failure has occurred in the computer system being operated.

(2) A program module which has caused the failure is specified by analysis by a person in charge of the system.

(3) Trace information indicating the course of processing of the program module is acquired during the next running time.

(4) The acquired trace information is analyzed.

(5) A cause of the failure is investigated.

The trace information is successively produced and output during the operation of the computer system. Therefore, if the trace information is to be acquired during the operation of the computer system, processing to store the trace information in a storage device periodically occurs so that a processing speed of original processing is lowered. Therefore, heretofore, no trace information has been acquired during the normal running time, and in many cases the person in charge of the system changes setting in such a manner as to acquire the trace information only when a failure has occurred. Additionally, in order to change the setting of the computer system being operated, approval of a user or an owner should be obtained, which would take much time in many cases.

On the other hand, in recent years, the computer system has played an indispensable role in a key business in addition to improvement of efficiency in office works in the company. Therefore, the computer system is not permitted to be stopped for a long time in order to investigate a cause of a failure occurring in the computer system. Therefore, even if the failure has occurred, the computer system is instantly restarted, and in many cases it is not possible to secure a time for obtaining the approval to acquire the trace information. Thus, in many cases, it has been difficult to remove the failure from the computer system being operated.

As a prior art technology, Japanese Published Patent Application 5-257758 discloses a system for automatically changing settings to acquire the course of processing of a transaction for a database when the transaction fails, so that the transaction is retried. According to this system, the cause of the failure which has occurred during the processing of the transaction can be easily investigated.

It is considered that the technology described in the above-described document is applicable to a failure of a computer system because the trace information can be automatically acquired. However, in the computer system, unlike the transaction, it is often difficult to determine whether or not a failure has occurred. For example, a failure in the transaction can be easily detected by an error code or the like recorded in a predetermined storage area. On the other hand, in the computer system, a failure often occurs due to composite factors of various modules, and an abnormal operation may occur even if each of the modules is normal. Furthermore, there may be a case in which processing is interrupted for some operational reason even if an actual failure does not occur. Thus, it is difficult to determine whether a failure has actually occurred in the computer system and, hence, to determine appropriate timing for producing trace information.

SUMMARY OF THE INVENTION

A first aspect of the present invention is directed to a trace information collecting system which collects trace information indicating the course of processing of a program, comprising a history recording section for recording a history of run and stop of a target program for which the trace information is to be produced, a similarity calculating section for calculating a degree of similarity between a first operation pattern in which the target program ran and stopped at the last time and a second operation pattern in which the target program ran and stopped at the time before last when the target program, which once stopped, starts to run, a failure occurrence determining section for determining that a failure occurred when the target program ran at the last time on condition that the similarity calculated by the similarity calculating section is lower than a reference similarity, and a trace information collecting section for collecting the trace information from the target program in response to the determination that the failure occurred, wherein the trace information is not collected if it is determined that the failure did not occur.

According to the present invention, the occurrence of the failure in the computer system can be appropriately detected, and the information required for removing or fixing the failure can be automatically collected.

BRIEF DESCRIPTION of the DRAWINGS

FIG. 2 shows one example of a data structure of a history recording section in the information processing device of FIG. 1.

DESCRIPTION OF THE PREFERRED EMBODIMENTS

While the present invention will be described below with reference to the embodiment of the present invention, the following embodiment does not limit the invention claimed in the attached claims, and all combinations of features described in the embodiment are not essential for solving the problems by the invention.

Figure 1:
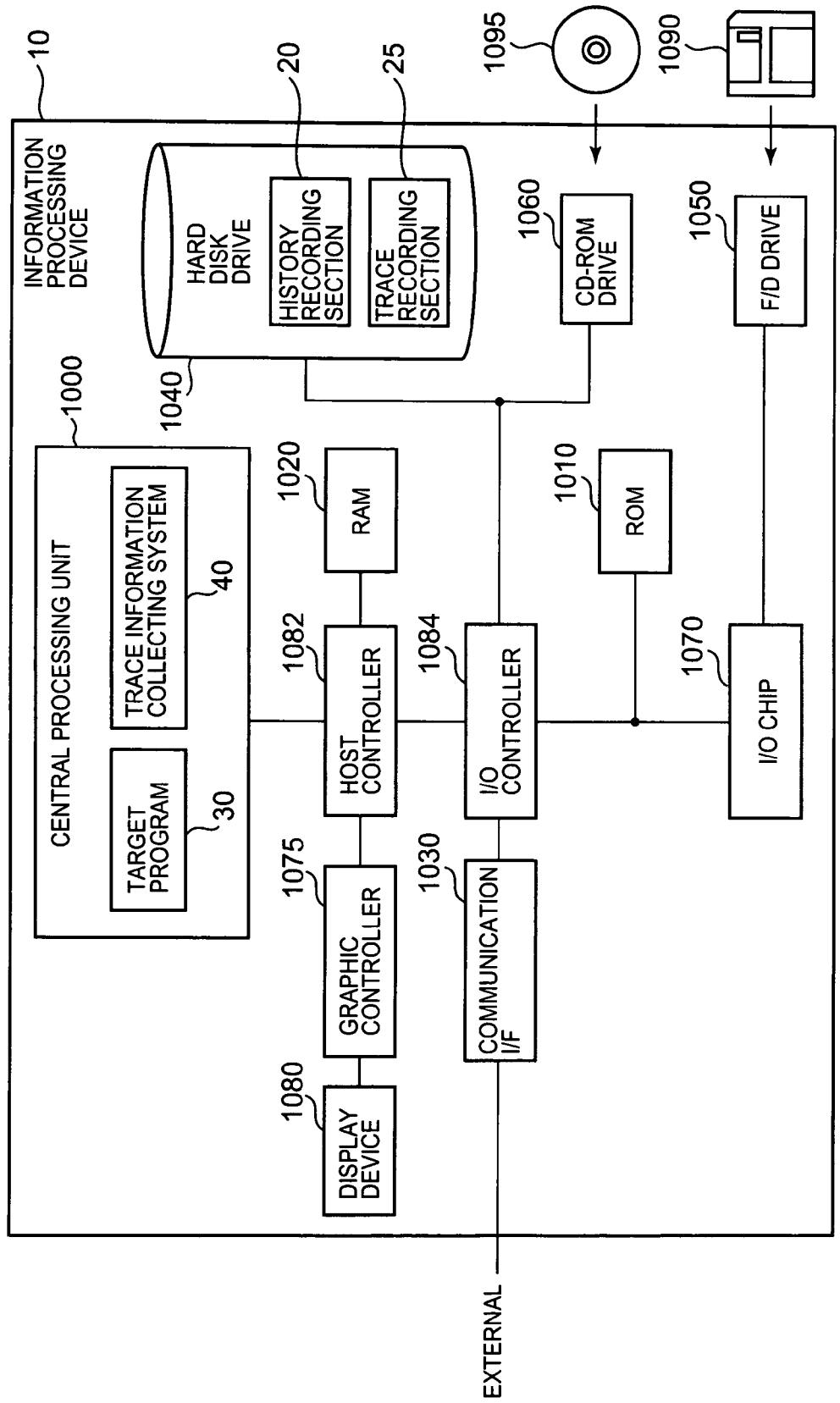
FIG. 1 is a functional block diagram illustrating an information processing device in which the present invention can be implemented.

FIG. 1 shows an illustrative configuration of an information processing device 10. The information processing device 10 includes a central processing unit 1000, a RAM 1020, and a graphic controller 1075 which form a CPU-related section and are interconnected via a host controller 1082. The information processing device 10 further includes an input/output section having a communication interface 1030, a hard disk drive 1040, and a CD-ROM drive 1060 which are connected to the host controller 1082 via an input/output controller 1084. The information processing device 10 further includes a legacy input/output section having a ROM 1010, a flexible disk drive 1050, and an input/output chip 1070 which are connected to the input/output controller 1084.

The central processing unit 1000 operates based on programs stored in the ROM 1010 and the RAM 1020 to control each section. For example, in the present embodiment, the central processing unit 1000 executes a target program 30 for which trace information is to be produced. The target program 30 is, for example, a middleware program which processes various types of services in response to a request received from an external client device. Alternatively, the target program 30 may be any type of operating system or application program. Furthermore, according to a trace information collecting program installed in the information processing device 10, the central processing unit 1000 functions as a trace information collecting system 40. The trace information collecting system 40 collects the trace information indicating the course of processing of the target program 30 and records the information in a trace recording section 25.

The host controller 1082 connects the RAM 1020 to the central processing unit 1000 and the graphic controller 1075 which access the RAM 1020 at a high transfer rate. The graphic controller 1075 acquires image data produced by the central processing unit 1000 or other device in a frame buffer disposed in the RAM 1020, and displays the data by a display device 1080. Alternatively, the graphic controller 1075 may contain therein the frame buffer which stores the image data produced by the central processing unit 1000 or other device.

The input/output controller 1084 connects the host controller 1082 to the communication interface 1030, the hard disk drive 1040, and the CD-ROM drive 1060 which are relatively high-speed input/output devices. The communication interface 1030 communicates with an external device via a network. The hard disk drive 1040 stores programs and data for use by the information processing device 10. For example, the hard disk drive 1040 functions as a history recording section 20 and the trace recording section 25. The history recording section 20 records a history of run and stop of the target program 30 by means of, for example, a function provided beforehand in the target program 30. The trace recording section 25 records the trace information collected by the trace information collecting system 40.

The CD-ROM drive 1060 reads a program or data from a CD-ROM 1095 and supplies it to the RAM 1020 or the hard disk drive 1040. The input/output controller 1084 is connected to relatively low-speed input/output devices such as the ROM 1010, the flexible disk drive 1050, and the input/output chip 1070. The ROM 1010 stores a boot program executed by the central processing unit 1000 when starting the information processing device 10, a program which depends on hardware of the information processing device 10, etc.

The flexible disk drive 1050 reads a program or data from a flexible disk 1090 and supplies it to the RAM 1020 or the hard disk drive 1040 via the input/output chip 1070. The input/output chip 1070 is connected to the flexible disk 1090, and various types of input/output devices via, for example, a parallel port, a serial port, a keyboard port, a mouse port, etc.

A program to be supplied to the information processing device 10 is stored in a recording medium such as the flexible disk 1090, the CD-ROM 1095, or an IC card, and supplied by a user. The program is read from the recording medium via the input/output chip 1070 and/or the input/output controller 1084, installed in the information processing device 10, and executed. The operation which the program causes the information processing device 10 to perform will be described later with reference to FIGS. 2 to 7.

The above-described program may be stored in an external storage medium. In addition to the flexible disk 1090 and the CD-ROM 1095, various storage media may be used which include an optical recording medium such as a DVD or a PD, a magnetic optical recording medium such as an MD, a tape medium, and a semiconductor memory such as an IC card. A storage device such as a hard disk or a RAM disposed in a server system connected to a dedicated communication network or the Internet may be used as the recording medium, and the program may be supplied to the information processing device 10 via the network.

FIG. 2 shows one example of a data structure of the history recording section 20. The history recording section 20 records a history of run and stop of the target program 30. For example, when the target program 30 is started to run, the history recording section 20 records that an event for starting the running occurred in association with a time at which the event occurred. Also when the target program 30 is stopped, the history recording section 20 records that an event for stopping the target program 30 occurred in association with a time at which the event occurred.

As an example, the history recording section 20 is an event log which also records other events which occurred in an application program or an operating system. That is, whenever a certain event occurs in a program, the history recording section 20 acquires and information indicating the occurrence of the event from the program, and records it in association with a time at which the event occurred. In this way, the history recording section 20 continues recording the event occurred while the target program 30 is running, regardless of whether or not a failure has occurred in the target program 30.

Furthermore, the history recording section 20 may record a type of a stop procedure for stopping the target program 30 when the target program 30 is stopped. Specifically, the history recording section 20 may record an immediate stop or shutdown procedure for interrupting and stopping already started processing, or a stop after completion procedure for stopping the already started processing after completion of the processing. For example, in a case where the target program 30 is a middleware program for processing a requested transaction, the transaction processing should be carefully handled when the target program 30 is stopped. For example, if the already started transaction processing is interrupted, a result of the processing before the interruption is lost. On the other hand, if the already started transaction processing is stopped after completion of the processing, a result of the processing is not lost, but much time is required for completing the stop procedure. Therefore, by recording the type of the stop procedure, a situation at the time of performing of the stop procedure can be speculated.

Figure 3:
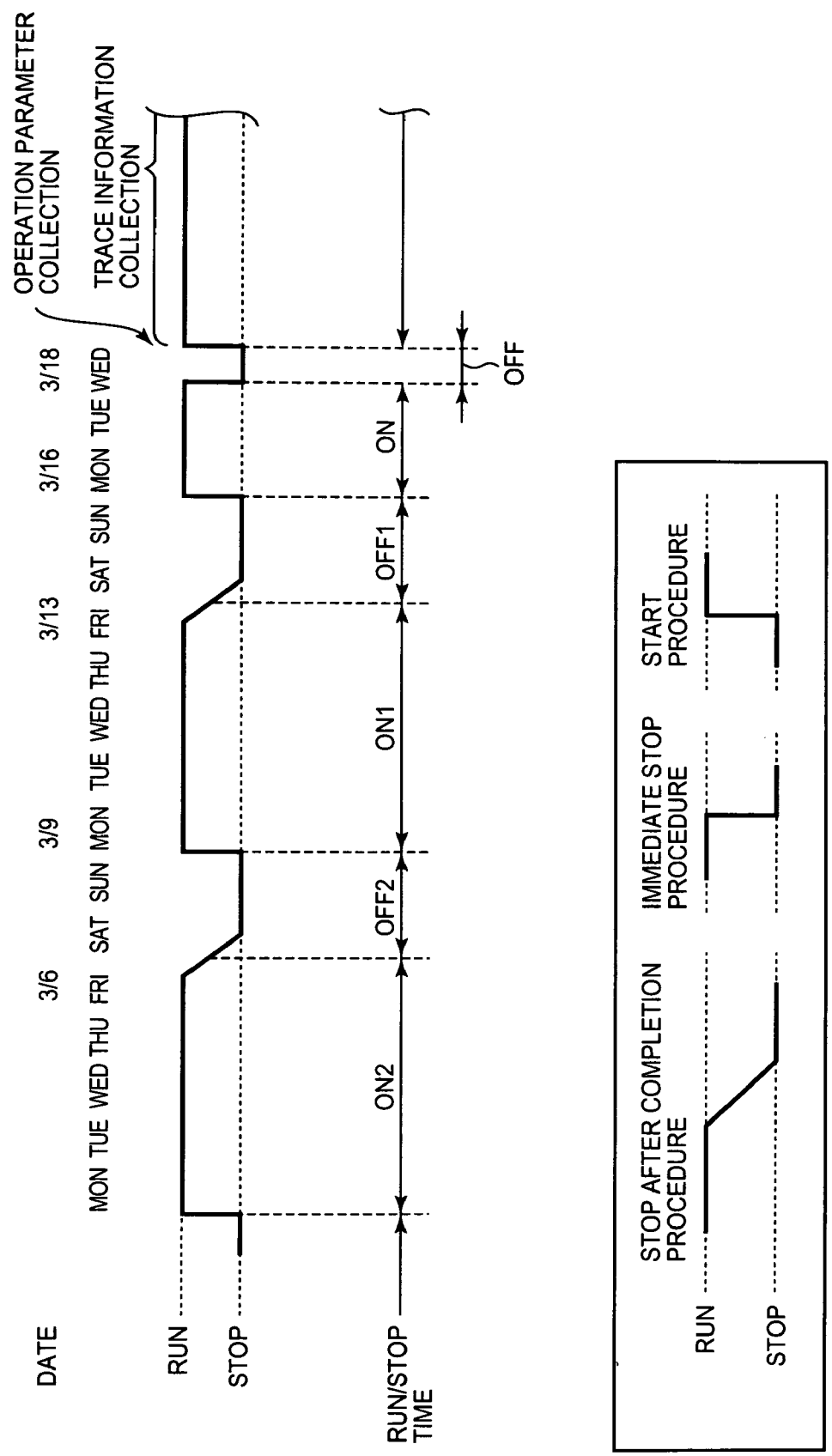
FIG. 3 shows one example of an operation pattern in which a target program runs an stops.

FIG. 3 shows one example of an operation pattern in which the target program 30 runs and stops. The operation pattern shown in FIG. 3 corresponds to the history recorded in the history recording section 20 of FIG. 2. Specifically, the target program 30 stopped at 19:00 on March 6 (Friday) by the stop after completion procedure. Then, the target program 30 started at 8:30 on March 9 (Monday), and stopped at 19:00 on March 13 (Friday) by the stop after completion procedure. That is, it seems that the target program 30 operated in accordance with an operation pattern starting in the morning of Monday and stopping at night on Friday.

However, after the target program 30 started at 8:30 on March 16 (Monday), the program stopped at 13:00 on March 18 (Wednesday) by the immediate stop procedure without waiting for March 20 (Friday). Thereafter, the target program 30 started again 15 minutes after. In a case where the operation pattern of run and stop at the last time is not similar to that before last, there is a high possibility that a certain failure has occurred in the operation of the target program 30. That is, when the target program 30, which usually starts at the beginning of the week and stops at the end of the week, is restarted on Wednesday, there is a high possibility that the failure occurred at that time.

Also, when the program stopped by the immediate stop procedure rather than the stop after completion procedure, there is a high possibility that a certain failure has occurred in the operation of the target program 30 because the program stopped despite the fact that an intermediate result of the already started processing was possibly lost. In the present embodiment, the trace information collecting system 40 has a purpose of appropriately detecting the failure occurrence in the target program 30 from the past operation patterns of run and stop and producing the trace information automatically.

Figure 4:
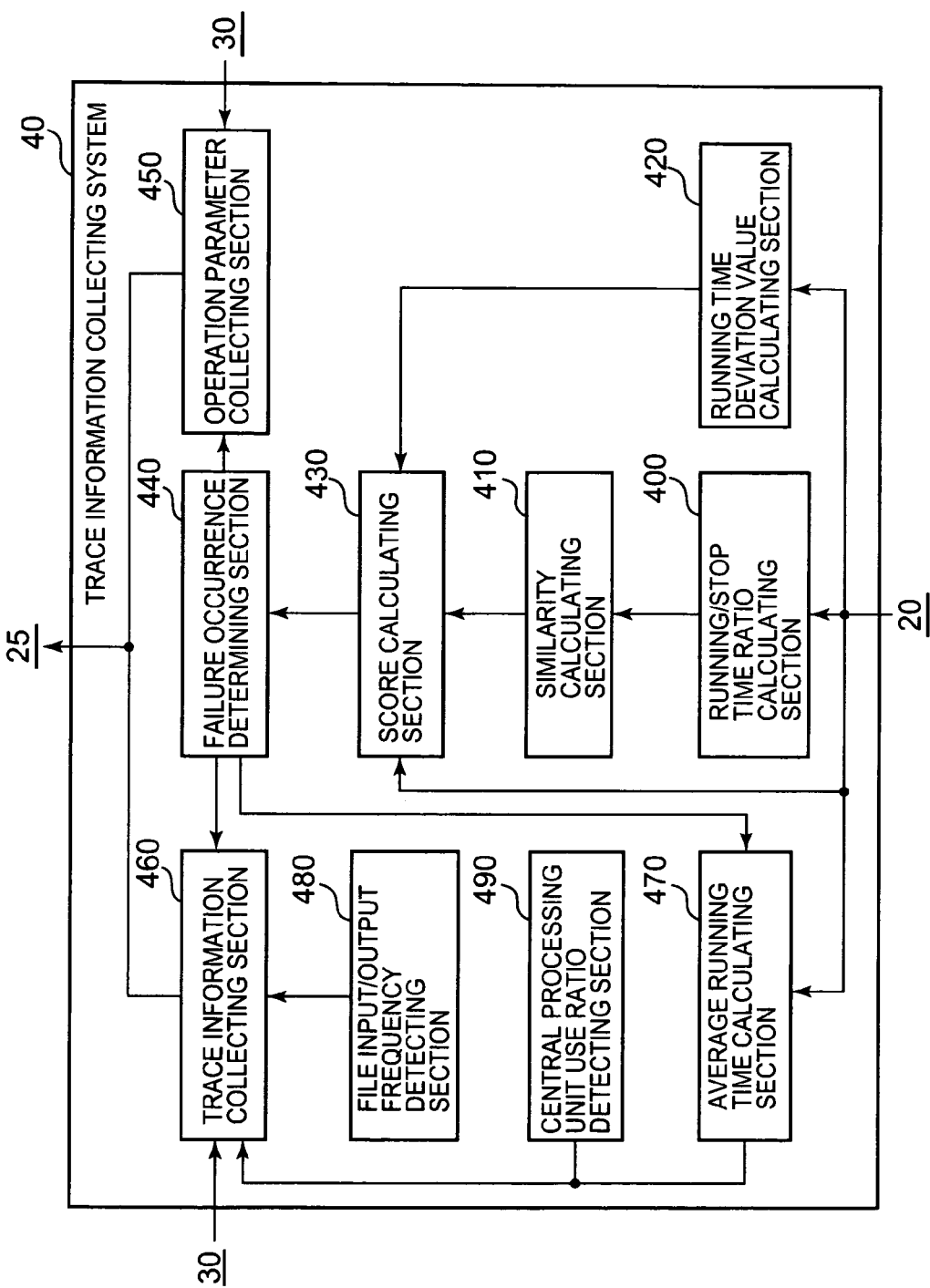
FIG. 4 is a functional block diagram illustrating a trace information collecting system in the information processing device of FIG. 1.

FIG. 4 shows functions of the trace information collecting system 40 in a block form. The trace information collecting system 40 has an running/stop time ratio calculating section 400, a similarity calculating section 410, an running time deviation value calculating section 420, a score calculating section 430, a failure occurrence determining section 440, an operation parameter collecting section 450, a trace information collecting section 460, an average running time calculating section 470, a file input/output frequency detecting section 480, and a central processing unit use ratio detecting section 490. The running/stop time ratio calculating section 400 calculates a running/stop time ratio which is a ratio of a stop or down time elapsed from a time when the target program 30 stopped until the program starts to run to a running time elapsed from a time when the program started to run until the program stops every time the target program 30 repeats the run and stop.

Specifically, in the example of FIG. 3, the running/stop time ratio calculating section 400 calculates a ratio of a running time ON2 to a stop time OFF2, a ratio of a running time ON1 to a stop time OFF1, and a ratio of a running time ON to a stop time OFF. The similarity calculating section 410 calculates a degree of similarity between a first operation pattern in which the target program 30 ran and stopped at the last time and a second operation pattern in which the target program 30 ran and stopped before last. More specifically, the similarity calculating section 410 may calculate a value indicating a deviation of the running/stop time ratio of the last run and stop in a probability distribution of the running/stop time ratio in each repetition of the run and stop to obtain the similarity.

The running time deviation value calculating section 420 obtains a probability distribution of a length of the running time in each repetition of the run and stop by the target program 30 based on the history of the run and stop recorded in the history recording section 20. Then, the running time deviation value calculating section 420 calculates a value indicating the deviation of the running time which elapsed from a time when the target program 30 started to run until the program stopped at the last time, in the probability distribution. The score calculating section 430 calculates a score indicating a possibility that a failure occurred in the target program 30 based on the similarity calculated by the similarity calculating section 410, the value calculated by the running time deviation value calculating section 420, and the history recorded in the history recording section 20.

The failure occurrence determining section 440 determines that the failure has occurred in the last run of the target program 30 on condition that the score calculated by the score calculating section 430 is higher than a predetermined reference value. On the other hand, the failure occurrence determining section 440 does not determine that the failure has occurred on condition that the score is equal to or less than the reference value. When the failure occurrence determining section 440 determines that the failure has occurred, the operation parameter collecting section 450 acquires operation parameters to be supplied to the target program 30, and records the parameters in the trace recording section 25 in response to the determination. The operation parameters may be acquired from an initialization file which is read when the target program 30 starts to run. The operation parameters may also be acquired from the target program 30 which has started to run, or environment variables of the operating system may be acquired as the operation parameters. The operation parameters may be changed momentarily by the progress of processing by the target program 30 or a user's operation. Therefore, if it is possible to save a snap shot of the operation parameters immediately after the failure occurrence, it can be useful for removing the failure.

In response to the determination by the failure occurrence determining section 440 that the failure has occurred, the trace information collecting section 460 collects the trace information which is not collected from the target program 30 in a case where it is not determined that the failure has occurred. Then, the trace information collecting section 460 successively records the collected trace information in the trace recording section 25. As a result, in the trace recording section 25, there are recorded the operation parameters at the time when the target program 30 started to run, and the trace information indicating the course of processing for a predetermined time period from the time when the target program 30 started to run. Accordingly, information required for analyzing a cause of the failure can be appropriately collected without requiring any special operation by a system administrator or the like.

Here, the collection of the operation parameters and the trace information refers to processing to acquire the operation parameters and the trace information output from the target program 30 or other entity, and record them in the recording medium of the information processing device 10 in a state in which they can be accessed later. Therefore, the trace information collecting system 40 may not necessarily explicitly instruct the target program 30 or other entity to output the trace information and/or operation parameters. For example, even if the trace information is not collected, the target program 30 continues writing the trace information with respect to an output stream, and the trace information collecting system 40 may acquire the information only if necessary.

The average running time calculating section 470 calculates an average running time from the time when the target program 30 started to run till the time when the program stopped based on the history of the running of the target program 30 recorded in the history recording section 20 in response to the determination by the failure occurrence determining section 440 that the failure has occurred. Then, the trace information collecting section 460 finishes collecting the trace information in a case where the average running time has elapsed from the time when the target program 30 started to run. Accordingly, excess collection of the trace information can be prevented, and the processing capability of the information processing device 10 can be maintained.

The file input/output frequency detecting section 480 detects, for example, periodically frequency of file input/ output of the information processing device 10 which executes the target program 30 on condition that the failure occurrence determining section 440 determines that the failure has occurred. Then, even if the trace information collecting section 460 is collecting the trace information, it finishes collecting the trace information if the frequency of the file input/output exceeds a predetermined reference frequency. Accordingly, in a case where the file input/output is frequently performed by original processing, a processing capability of file input/output of the information processing device 10 can be maintained, and the original processing can be efficiently executed.

The central processing unit use ratio detecting section 490 detects, for example, periodically a use ratio of the central processing unit 1000 of the information processing device 10 which executes the target program 30 on condition that the failure occurrence determining section 440 determines that the failure has occurred. Then, even if the trace information collecting section 460 is collecting the trace information, it finishes collecting the trace information if the use ratio of the central processing unit 1000 exceeds a predetermined reference use ratio. Accordingly, in a case where the processing capability of the central processing unit 1000 is required for the original processing, the processing capability of the central processing unit 1000 can be maintained, and the original processing can be efficiently executed.

Figure 5:
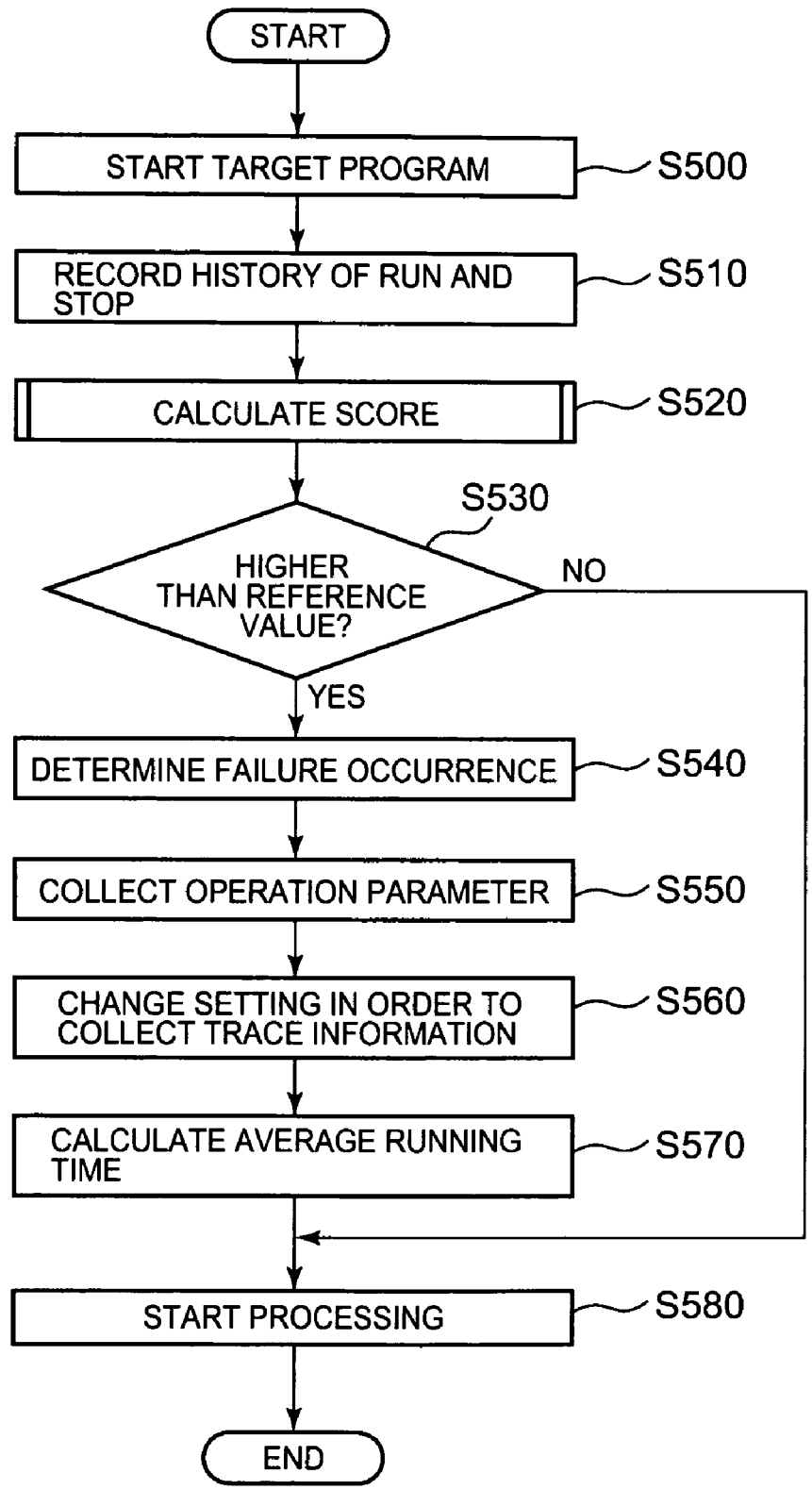
FIG. 5 is a flowchart of processing in which the trace information collecting system of FIG. 4 starts collection of trace information.

FIG. 5 shows a flowchart of processing to start to collect the trace information by the trace information collecting system 40. When the stopped target program 30 starts to run (S500), first the history recording section 20 records a history indicating that the target program 30 started to run (S510). Next, the score calculating section 430 calculates a score indicating a possibility that a failure has occurred in the target program 30 (S520). If the score calculated by the score calculating section 430 is equal to or less than a predetermined reference value (S530: NO), the trace information collecting system 40 causes the target program 30 to start normal processing (S580), and does not collect any trace information in the course of processing of the target program 30.

On the other hand, if the score calculated by the score calculating section 430 is higher than the predetermined received (S530: YES), the failure occurrence determining section 440 determines that the failure has occurred in the last run of the target program 30 (S540). When the failure occurrence determining section 440 determines that the failure has occurred, first the operation parameter collecting section 450 collects operation parameters to be supplied to the target program 30 in response to the determination (S550). Next, the trace information collecting section 460 changes setting in order to collect the trace information (S560). The average running time calculating section 470 calculates the average running time from the time when the target program 30 started to run till the time when the program stopped based on the history of the run of the target program 30 recorded in the history recording section 20 (S570). Then, the trace information collecting system 40 causes the target program 30 to start normal processing (S580), and the trace information collecting section 460 collects the trace information in the course of processing of the target program.

Figure 6:
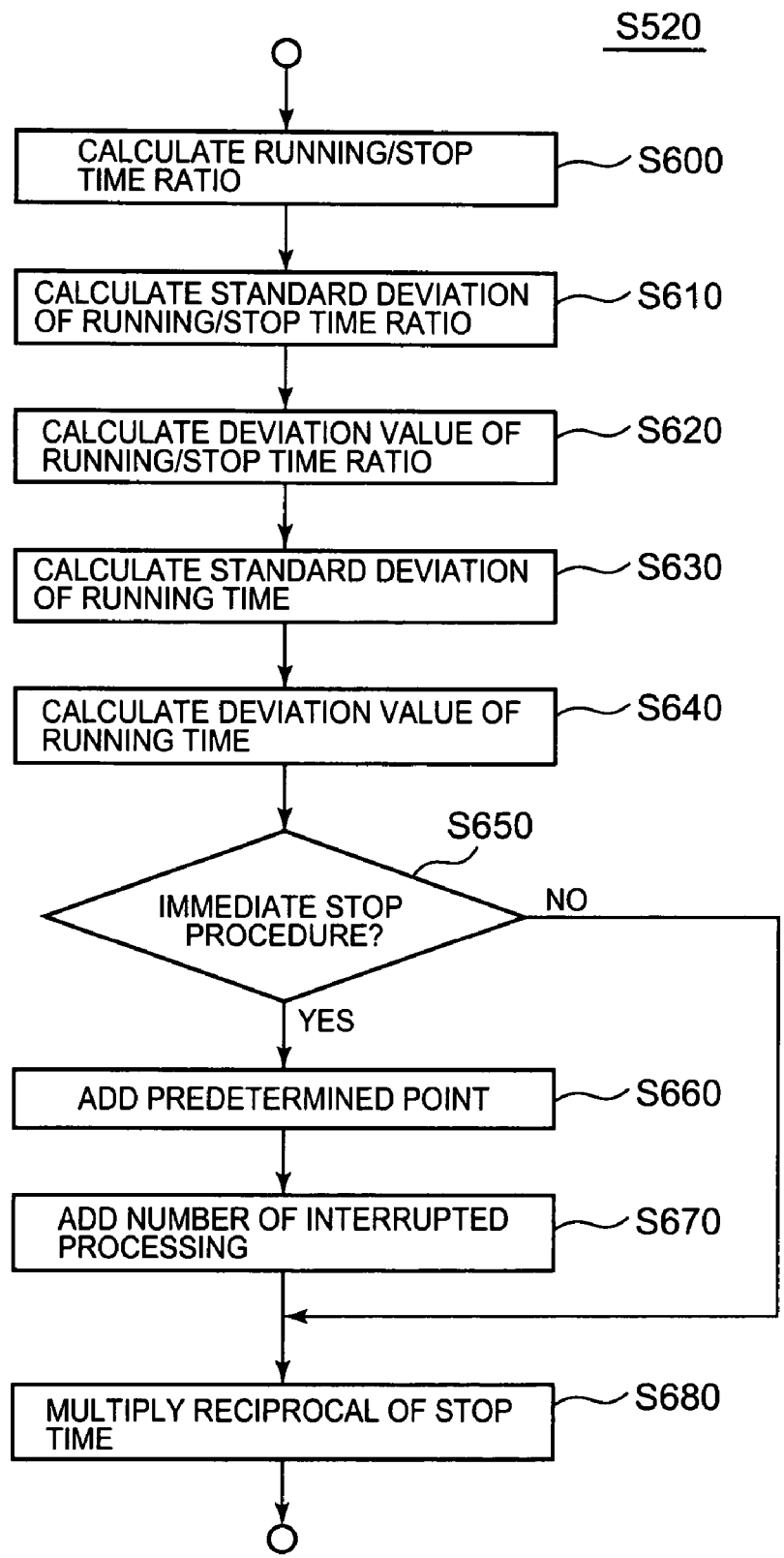
FIG. 6 is a flowchart showing details of processing in S520 of FIG. 5.

FIG. 6 is a flowchart showing details of processing in S520 of FIG. 5. The running/stop time ratio calculating section 400 calculates the running/stop time ratio every time the target program 30 repeats the run and stop (S600). Next, the similarity calculating section 410 calculates a standard deviation based on the probability distribution of each running/stop time ratio (S610).

Then, the similarity calculating section 410 calculates a value indicating the deviation of the running/stop time ratio in the last run and stop of the target program 30 as an index value indicating the similarity of the operation pattern based on the calculated standard deviation (S620). For example, the similarity calculating section 410 obtains the deviation value of the running/stop time ratio in the last run and stop, and obtains an absolute value of a difference from a median of deviation values in the probability distribution at the time before last. Alternatively, the similarity calculating section 410 may obtain a chi-square test value of the running/stop time ratio in the last run and stop against the probability distribution at the time before last.

The score calculating section 430 calculates this value as the score indicating the possibility that the failure has occurred in the target program 30. This value indicates a degree of similarity between a first operation pattern in which the target program 30 ran and stopped at the last time and a second operation pattern in which the target program 30 ran and stopped at the time before last. When this value is higher, the deviation of the running/stop time ratio in the last run and stop becomes higher, and therefore the similarity becomes lower. That is, the score calculated by the score calculating section 430 has a higher value in a case where the similarity determined by the similarity calculating section 410 is lower.

Accordingly, the failure occurrence determining section 440 can determine that the failure has occurred in the last run of the target program 30 on condition that the similarity calculated by the similarity calculating section 410 is lower than a reference similarity.

Subsequently, the running time deviation value calculating section 420 calculates the standard deviation based on the probability distribution of the running time every time the target program 30 repeats the run and stop (S630). Then, the running time deviation value calculating section 420 calculates a value indicating the deviation of the running time in the last run of the target program 30 based on the calculated standard deviation (S640). For example, the running time deviation value calculating section 420 may obtain the deviation value of the last running time, and obtain the absolute value of the difference from the median of the deviation values in the probability distribution of the running time before last. Then, the score calculating section 430 adds the obtained value to the score.

Accordingly, even if it is difficult to determine the failure occurrence based on the similarity, the failure occurrence determining section 440 can determine that the failure has occurred on condition that the value indicating the deviation of the running time is higher than the reference value.

Subsequently, the score calculating section 430 determines whether or not the stop procedure which stopped the target program 30 at the last time is the immediate stop procedure (S650). If it is the immediate stop procedure (S650: YES), the score calculating section 430 adds a predetermined point to the score (S660). That is, the score calculated by the score calculating section 430 has a higher value in a case where the stop procedure which stopped the target program 30 at the last time is the immediate stop procedure as compared with the stop after completion procedure.

Accordingly, even if it is difficult to determine the failure occurrence even by the similarity and the deviation of the running time, the failure occurrence determining section 440 can determine that the failure has occurred on condition that the last stop procedure is the immediate stop procedure.

Furthermore, the score calculating section 430 adds a point corresponding to the number of processings interrupted in the immediate stop procedure to the score (S670). This is because when the number of processings performed in parallel is large, it is expected that a possibility that the failure occurs due to a composite factor of the processings becomes high. Accordingly, even if it is difficult to determine the failure occurrence even by the type of the stop procedure, the failure occurrence determining section 440 can determine that the failure has occurred on condition that the number of processings interrupted by the immediate stop procedure is larger than a reference number.

Then, the score calculating section 430 obtains the stop time which elapsed from a time when the target program 30 stopped until the program started to run at the last time, and multiplies the score by a reciprocal of the stop time to one hour (S680). That is, if the stop time is less than one hour, the score increases. If the stop time is longer than one hour, the score decreases. Accordingly, even if it is difficult to determine the failure occurrence even by the type of the stop procedure, etc., the failure occurrence determining section 440 can determine that the failure has occurred on condition that the stop time from a time when the target program 30 stopped at the last time until the program started to run is shorter than a reference stop time.

Thus, according to the processing shown in FIG. 6, the score indicating the possibility that the failure has occurred in the running of the target program 30 can be obtained by simple calculation based on the similarity of the running time, the deviation of the running time, the type of the stop procedure, and the last stop time. Therefore, the failure occurrence determining section 440 can promptly determine whether or not the failure has occurred without delaying restart processing and other original processing even in an emergency situation in which the failure has occurred in the target program 30 and prompt restarting is required.

It is to be noted that all the processing steps shown in FIG. 6 is not essential for the calculation of the score, and a part of the processing shown in FIG. 6 may be removed from the calculation of the score. For example, the score calculating section 430 may calculate the score based on the deviation of the running/stop time ratio and whether or not the stop procedure is the immediate stop procedure with the deviation of the running time excluded from the elements for the score calculation. Any calculating method which excludes a part of the processing is also included in the technical scope of the present invention.

Figure 7:
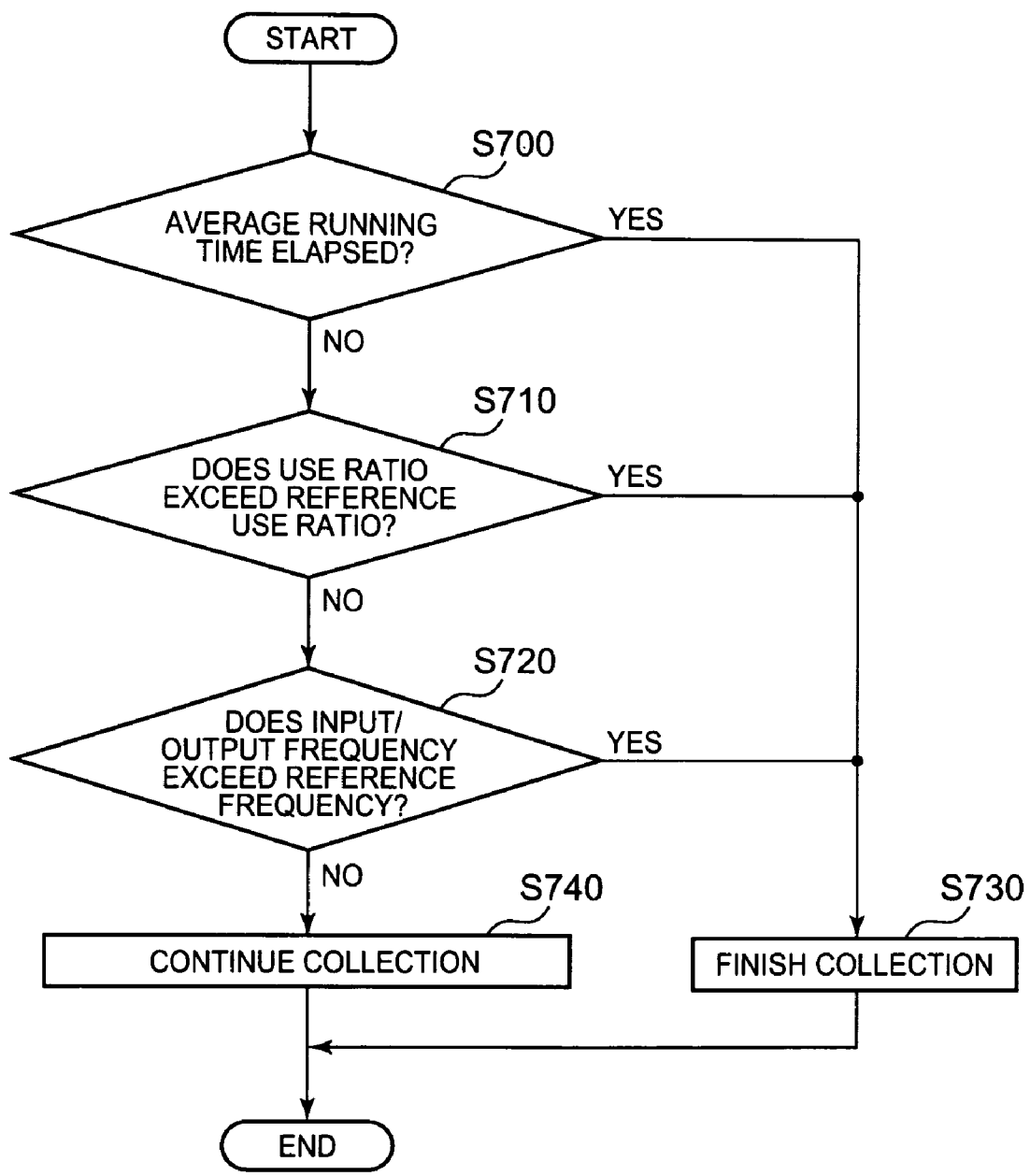
FIG. 7 is a flowchart of processing in which the trace information collecting system of FIG. 4 finishes collection of the trace information.

FIG. 7 shows a flowchart of processing in which the trace information collecting system 40 finishes the collection of the trace information. The trace information collecting system 40 performs, for example, periodically the following processing when the trace information is collected. First, if the average running time has elapsed from a time when the target program 30 started to run (S700: YES), the trace information collecting section 460 finishes the collection of the trace information (S730).

The central processing unit use ratio detecting section 490 detects the use ratio of the central processing unit 1000 of the information processing device 10 which executes the target program 30. If the use ratio exceeds a predetermined reference use ratio (S710: YES), the trace information collecting section 460 finishes the collection of the trace information (S730). The file input/output frequency detecting section 480 detects the frequency of the file input/output of the information processing device 10 which executes the target program 30. If the frequency exceeds a predetermined reference frequency (S720: YES), the trace information collecting section 460 finishes the collection of the trace information (S730). Otherwise, the collection of the trace information is continued (S740).

It is to be noted that instead of the example shown in FIG. 7, the trace information collecting section 460 may always finish the collection of the trace information if a predetermined period has elapsed from a time when the collection of the trace information was started, or may continue collecting the trace information until an instruction is received from the user. In these cases, certain processing does not have to be performed in order to determine the finishing during the collection of the trace information, so that the original processing of the target program 30 can be executed more efficiently.

According to the above-described trace information collecting system 40 of the present embodiment, even if any explicit error code or the like is not obtained from a program, the failure occurred during the execution of the program can be appropriately detected, and the information required for the failure analysis can be automatically collected. Accordingly, the setting change which has heretofore been manually performed is not required, and the efficiency of the handling of the failure in the computer system being operated can be improved more. Furthermore, precision of the failure detection can be enhanced by using various parameters in the detection/determination of the failure.

While the present invention has been described above with reference to the embodiment, the technical scope of the present invention is not limited to the scope of the above-described embodiment. It is apparent for a person skilled in the art that the above-described embodiment can be variously altered or improved. It is apparent from the description of the claims that such altered or modified embodiments can be included in the technical scope of the present invention.

The invention claimed is:

1. A trace information collecting method for collecting trace information showing the processing history of a program, comprising:
   a history recording step for recording the run/stop history of a target program that is the target for generating trace information;
   a similarity calculating step for calculating, as a degree of similarity, a value indicating a deviation in a probability distribution of time ratios of a running time and a stop time each time there is repetitive running and stopping, the last time that the target program was run, and prior to the last time that the target program was run, of the time ratios of the running time and the stop time in the repetitive running and stopping the last time that the target program was run, when starting an operation of the target program that has been stopped;
   a failure occurrence determining step for determining that a failure occurred the last time the target program ran, on condition that the similarity calculated by the similarity calculating step is lower than a reference similarity; and
   a trace information collecting step for collecting sequentially trace information, which is not collected when there is no determination that a failure has occurred, from the started target program in response to the determination that a failure occurred.

* * * * *